(12) United States Patent
Evstifeev et al.

(10) Patent No.: US 11,785,687 B2
(45) Date of Patent: Oct. 10, 2023

(54) POWER CONVERTER AND SYNCHRONOUS-ASYNCHRONOUS MODE CONTROL

(71) Applicant: Infineon Technologies Austria AG, Villach (AT)

(72) Inventors: Alexey Evstifeev, Unterhaching (DE); Tiam Poh Lau, Munich (DE); Michael Weirich, Unterhaching (DE)

(73) Assignee: Infineon Technologies Austria AG, Villach (AT)

( * ) Notice: Subject to any disclaimer, the term of this patent is extended or adjusted under 35 U.S.C. 154(b) by 28 days.

(21) Appl. No.: 17/412,533

(22) Filed: Aug. 26, 2021

(65) Prior Publication Data

US 2023/0068030 A1 Mar. 2, 2023

(51) Int. Cl.
H05B 45/375 (2020.01)
H02M 1/00 (2006.01)

(52) U.S. Cl.
CPC ........ H05B 45/375 (2020.01); H02M 1/0009 (2021.05)

(58) Field of Classification Search
CPC ........ H05B 45/10; H05B 45/32; H05B 45/20; H05B 45/37; H05B 45/325; H05B 45/375; H02M 1/0009
See application file for complete search history.

(56) References Cited

U.S. PATENT DOCUMENTS

| 10,624,165 | B1 * | 4/2020 | Borghetti | H05B 45/39 |
| 2007/0036036 | A1 * | 2/2007 | Kadish | A61J 7/0481 |
| | | | | 368/230 |
| 2010/0266000 | A1 * | 10/2010 | Froimovich | H04B 15/02 |
| | | | | 725/111 |
| 2011/0127923 | A1 * | 6/2011 | Lin | H05B 45/38 |
| | | | | 315/193 |

FOREIGN PATENT DOCUMENTS

| CN | 109076664 A | * 12/2018 | ............. F21S 2/005 |
| JP | 2020198243 A | * 12/2020 | |
| JP | 2021102027 A | * 7/2021 | |

* cited by examiner

Primary Examiner — Abdullah A Riyami
Assistant Examiner — Syed M Kaiser
(74) Attorney, Agent, or Firm — Armis IP Law, LLC

(57) ABSTRACT

An apparatus includes a controller (such as associated with a power converter). The controller is operative to receive input control settings. Based on the input control settings, the controller controls a magnitude of an output current generated by the power converter. The output current from the power converter powers light emitting hardware. The controller transitions between operating the power converter in an asynchronous mode and a synchronous mode to produce the output current.

26 Claims, 13 Drawing Sheets

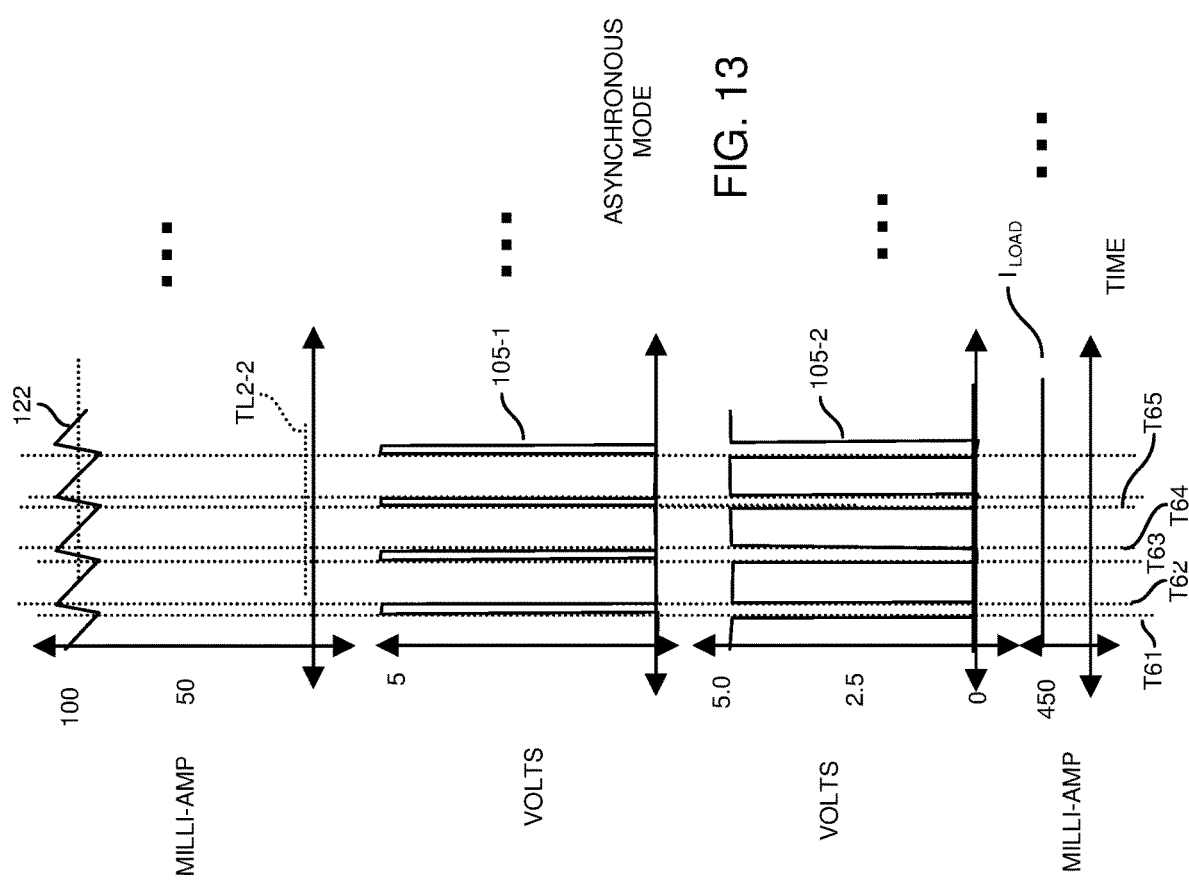

POWER CONVERTER AND SYNCHRONOUS-ASYNCHRONOUS MODE CONTROL

BACKGROUND

One type of conventional power converter is a regulator. In general, to maintain an output signal within a desired range, a controller in the regulator compares the magnitude of a generated output signal to a setpoint reference value. Based on a respective error signal derived from the comparison, the controller modifies a respective switching frequency and/or pulse width modulation associated with activating high side switch circuitry and/or low side switch circuitry in the regulator to maintain a magnitude of the output signal.

Conventional techniques of controlling LED (Light Emitting Diode) lighting include implementation of a respective power converter (such as a regulator implemented as buck converter topology) to drive an LED module with appropriate current as selected by an operator.

BRIEF DESCRIPTION

Implementation of clean energy (or green technology) is very important to reduce human impact on the environment. In general, clean energy includes any evolving methods and materials to reduce an overall toxicity on the environment from energy consumption.

This disclosure includes the observation that raw energy, such as received from green energy sources or non-green energy sources, typically needs to be efficiently converted into an appropriate form (such as desired AC voltage, DC voltage, desired output current, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy (such as storage and subsequent distribution) provided by such sources to reduce our impact on the environment. This disclosure contributes to reducing our carbon footprint and providing better use of energy via more efficient energy conversion.

This disclosure further includes the observation that conventional power supplies used to drive a respective light source suffer from deficiencies. For example, to regulate a low output current for lighting application, e.g. 0.1% or 1% dimming, a typical CCM (Continuous Conduction Mode) buck controller has to implement so-called pulse-skipping. For example, the conventional controller implements pulse skipping with 3.4 kHz frequency PWM dimming when output current set-point is between 0.5% and 12.5%.

Such pulse skipping method however causes visible dimming, because:
  The number of dimming step is limited by the ratio of switching frequency ($f\_sw$) to pulse-skipping frequency ($f\_PWM$)
  For example, if $f\_sw$=100 kHz and $f\_PWM$=3.4 kHz, the number of dimming step is about 33, resulting an increasing output current change % per pulse skipping from 3.33% to 50%, which exceeds DALI dimming step requirement of 2.7%
  $f\_PWM$=3.4 kHz is selected to comply with IEEE1789 modulation limit, so it cannot be reduced to increase the dimming step resolution The technical issues associated with supplying low current to a respective load can be implemented in multiple ways. For example, a conventional controller can be configured to implement so-called a) fractional bursts or b) operate in a so-called discontinuous conduction mode (DCM).
  a) Fractional burst
    Instead of pulse-skipping, a fractional burst pulse is inserted to reduce the output current % change per step
    Disadvantage: Complicated control. Current implementation done using micro-controller
  b) Discontinuous conduction mode (DCM)
    Switched from CCM to DCM at low output current
    Disadvantage: Risk of mode transitional flicker and audible noise with low frequency DCM operation for low dimming application In contrast to conventional techniques, embodiments herein include novel and improved ways of providing improved low current control to drive respective light emitting hardware.

More specifically, embodiments herein include an apparatus. In one embodiment, the apparatus (such as a power converter circuit) includes a controller. The controller controls a magnitude of an output current generated by a power converter. The output current from the power converter is operative to power light emitting hardware. The controller transitions between operating the power converter in an asynchronous mode and a synchronous mode to produce the output current.

In further example embodiments, the power converter includes low-side switch circuitry and a diode component disposed in parallel. The controller uses the low side switch circuitry and the diode in different modes. For example, in one embodiment, the controller is operative to switch the low side switch circuitry ON and OFF (as well as switch high side switch circuitry ON and OFF) in each control cycle during operation of the power converter in the synchronous mode. The controller is further operative to continuously deactivate the low side switch circuitry during control cycles while the power converter is operated in the asynchronous mode. In this latter instance, the combination of switching the high side switch circuitry and the presence of the diode supports asynchronous operation In still further example embodiments, the controller is operative to control switching of the power converter in accordance with the asynchronous mode during conditions in which the input control settings indicate to provide power to the light emitting hardware above a threshold level.

Conversely, the controller is operative to control switching of the power converter in accordance with the synchronous mode during conditions in which the input control settings indicate to provide power to the light emitting hardware below a threshold level. In one embodiment, the synchronous mode is a forced continuous conduction mode in which current through a respective inductor of the power converter reverses direction one or more times during a respective control cycle.

In still further example embodiments, as previously discussed, operation of the power converter in the asynchronous mode includes implementation of high side switch circuitry and a corresponding diode in the power converter to produce the output current. Conversely, operation in the synchronous mode includes implementation of switching between activating high side switch circuitry and low side switch circuitry in the power converter to produce the output current.

Further embodiments herein include, via the controller, transitioning the power converter from operating in the asynchronous mode and the synchronous mode depending on a parameter such as a magnitude of the output current as requested by the input control settings. The change in the operational mode of the power converter can be prompted based on a change in the control settings. For example, in one embodiment, the controller detects or receives a change in the control settings from a first (light) setting to a second (light) setting. The second setting indicates to reduce light output from the light emitting hardware with respect to the first setting. In response to receiving the change in the control settings, the controller transitions the power converter from operating in the asynchronous mode to operating in the synchronous mode (such as including a forced continuous conduction mode). Implementation of the synchronous mode provides better control of generating the output current used to power the light emitting hardware than the asynchronous mode in lower output power/current condition.

Thus, the controller transitions the power converter from operating in the asynchronous mode to the asynchronous mode in response to a change of the input control settings from a first setting to a second setting, the second setting indicating to decrease light output from the light emitting hardware with respect to the first setting.

Further embodiments herein include, via the controller, transitioning the power converter from operating in the synchronous mode and the asynchronous mode depending on a magnitude of the output current as requested by the input control settings. The change in the operational mode of the power converter can be prompted based on a change in the control settings. For example, in one embodiment, the controller detects or receives a change in the control settings from a second (light) setting to a first (light) setting. The first setting indicates to increase light output from the light emitting hardware with respect to the second setting. In response to receiving the change in the control settings, the controller transitions the power converter from operating in the synchronous mode to the asynchronous mode. The asynchronous mode saves the cost of using a low-ohmic switch when generating the output current used to power the light emitting hardware than the synchronous mode in medium to high power/current consumption conditions.

Thus, the controller transitions the power converter from operating in the synchronous mode to the asynchronous mode in response to a change of the input control settings from a first setting to a second setting, the second setting indicating to increase light output from the light emitting hardware with respect to the first setting.

As further discussed herein, the power converter can be configured to include an inductor component (inductor hardware such as one or more inductors) operative to supply the output current to the light emitting hardware. Implementation of a forced continuous conduction mode (such as while in the synchronous mode) results in the output current flowing in both a forward direction and reverse direction at different times through the inductor component during a respective control cycle of operating the power converter.

Further embodiments herein include, via the controller, implementing hysteretic mode transitions between operation in the asynchronous mode and operation in the synchronous mode. This prevents unwanted high frequency toggling between the asynchronous mode and the synchronous mode.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices or processing hardware) to: receive input control settings; control a magnitude of an output current generated by a power converter based on the input control settings, the output current from the power converter operative to power light emitting hardware; and transition between operating the power converter in an asynchronous mode and a synchronous mode to produce the output current.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

The foregoing and other objects, features, and advantages of the embodiments herein will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 13 is an example timing diagram illustrating operation of a power converter in an asynchronous mode according to embodiments herein.

DETAILED DESCRIPTION

An apparatus includes a controller (such as associated with a power converter). The controller receives input control settings associated with controlling respective light emitting hardware. Based on a parameter such as the input control settings, the controller controls a magnitude of an output current generated by the power converter. The output current from the power converter powers the light emitting hardware. During operation, the controller transitions between operating the power converter in an asynchronous mode and a synchronous mode to produce the output current.

For example, the controller transitions the power converter from operating in the asynchronous mode to the synchronous mode in response to detecting that the magnitude of the output current (or requested light setting) as indicated by the input control settings is below a threshold level. The synchronous mode of controlling the power converter provides better control of generating the output current during low output power/current conditions.

Conversely, the controller transitions the power converter from operating in the synchronous mode to the asynchronous mode in response to detecting that the magnitude of the output current (or requested light setting) as indicated by the input control settings is above a threshold level. The asynchronous mode of controlling the power converter provides better control of generating the output current during higher power/current consumption conditions.

Figure 1:
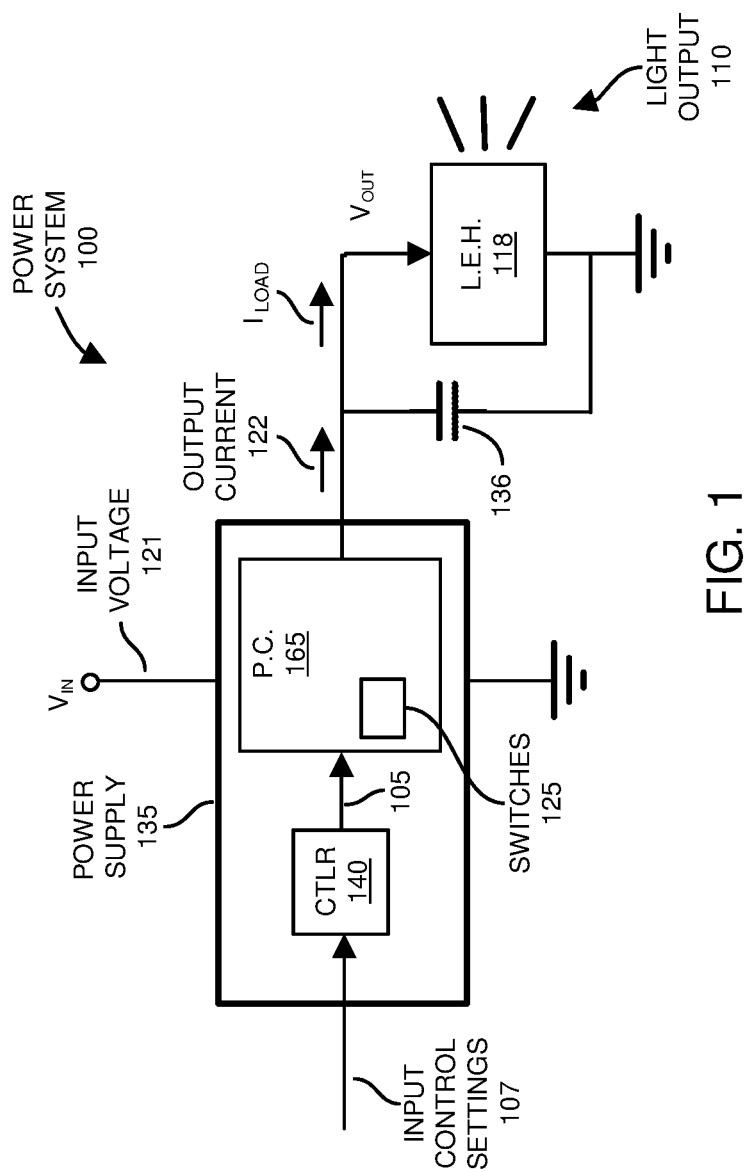
FIG. 1 is an example general diagram of a power supply supporting multi-mode operation according to embodiments herein.

Now, more specifically, FIG. 1 is an example general diagram of a power supply and corresponding controller according to embodiments herein.

In this example embodiment, the power system 100 includes power supply 135 and light emitting hardware 118 (load such as an assembly of one or more LEDs, one or more light emitting devices, etc.).

Power supply 135 includes multiple components such as controller 140 and power converter 165. Power converter 165 includes one or more switches 125 controlled by the controller 140 depending on the input control settings 107.

More specifically, during operation, the input control settings 107 indicate a magnitude in which to supply output current 122 to the light emitting hardware 118. In one embodiment, the light emitting hardware 118 supports a range of different light output levels. Via control of switches 125, and based at least in part on the control settings information 107 such as indicating a setting (within the range of different light outputs) associated with the light emitting hardware 118, the power converter 165 converts the input voltage 121 (such as any suitable DC input voltage) into the output current 122 (such as any suitable DC output current setting). The output current 122 supplies current to capacitor 136 and light emitting hardware 118.

The magnitude of the output current 122 tracks the input control settings 122. For example, if the input control settings 122 indicate to supply maximum power to the light emitting hardware 118, the controller 140 operates the power converter 165 to output a maximum output current 122 associated with the range; if the input control settings 122 indicate to supply minimum power to the light emitting hardware 118, the controller 140 operates the power converter 165 to output a minimum output current 122 associated with the range; if the input control settings 122 indicates to supply 50% of maximum power to the light emitting hardware 118, the controller 140 operates the power converter 165 to output 50% of a maximum output current 122 associated with the range; and so on.

Figure 2:
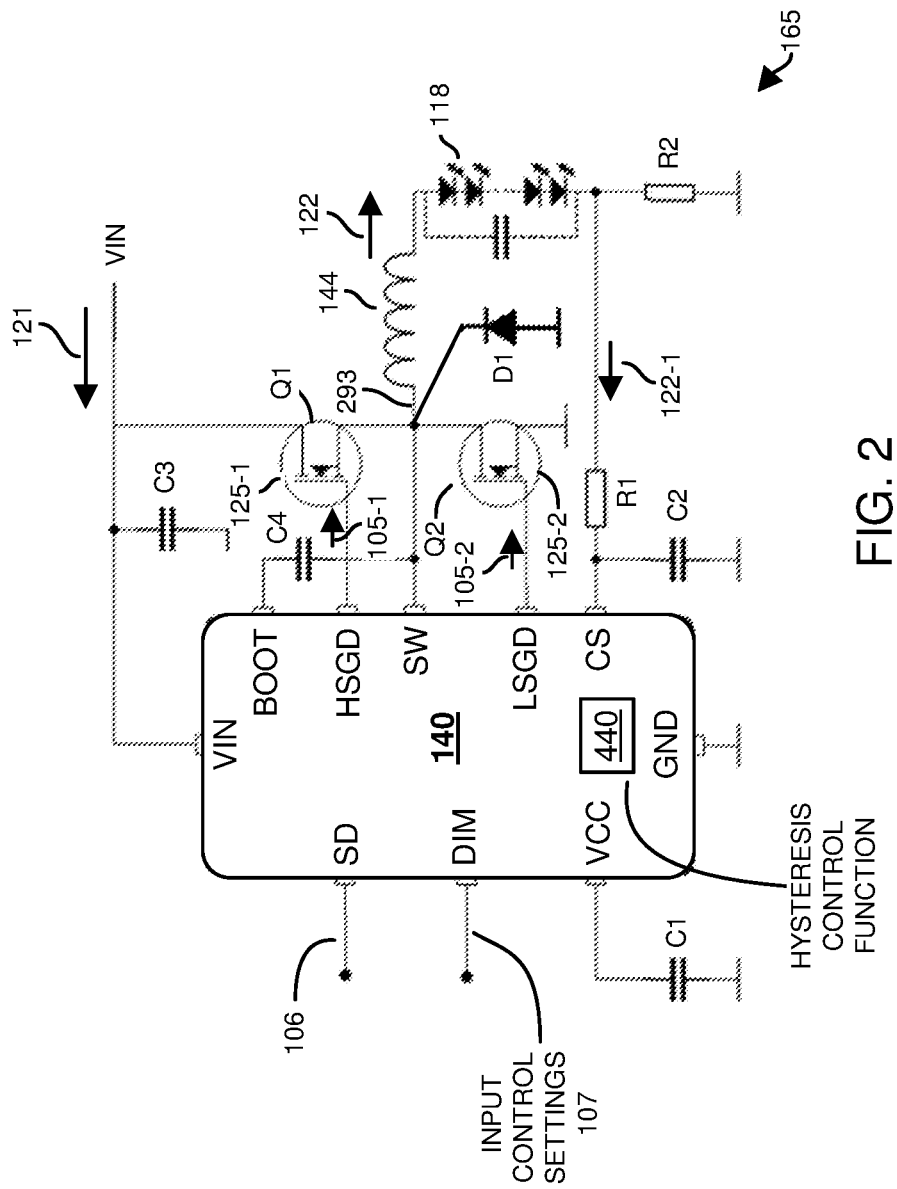
FIG. 2 is an example detailed diagram illustrating a power converter circuit according to embodiments herein.

FIG. 2 is an example detailed diagram illustrating a controller and corresponding power converter circuit according to embodiments herein.

In this example embodiment, the controller 140 (such as a semiconductor chip, integrated circuit, circuit component, etc.) includes multiple pins such as Vin, GND, SD, DIM, Vcc, BOOT, HSGD, SW, LSGD, and CS.

Input pin Vin of controller 140 is configured to receive the input voltage 121 used to produce the output current 122.

Input pin GND of controller 140 is configured to provide a ground reference voltage.

Input pin SD of the controller 140 is configured to receive control signal 106, which enables shutdown of the controller 140 such as when set to a logic low. Control signal 106 set to a logic high enables the controller 140.

Input pin DIM of the controller 140 is configured to receive input control settings 107 used to control a magnitude of the output current 122 produced by the power converter 165. In one embodiment, the input control settings 107 is a pulse width modulation signal. The duty cycle of the pulse width modulation signal indicates a respective setting or setpoint of producing the output current 122. In one non-limiting example embodiment, the input control settings 107 represent a PWM input signal between 200 Hz and 30 kHz (or other suitable range), which controls dimming of the LEDs current in analog mode from 100 percent to 12.5 percent and 12.5 percent to 0.5 percent in hybrid mode with flicker-free modulation frequency of 3.4 kHz (or other suitable value). These specifications may vary depending on the embodiment.

Input pin BOOT is configured to include an internal switch driver bootstrap, connected to bootstrap capacitor C4. At initial startup, by turning on Q2, the BOOT pin is used to charge the node 293 (SW) to a voltage so that high side switch circuitry Q1 can be activated after turning off switch Q2.

Output pin HSGD produces control signal 105-1 to control the gate and state of switch Q1 (a.k.a., high side switch circuitry).

Output pin LSGD produces control signal 105-2 to control the gate and state of switch Q2 (a.k.a., low side switch circuitry). In one embodiment, switch Q2 is integrated in the controller 140 and saves the need for the LSGD pin.

Pin SW of the controller 140 is connected to an internal switch output of the controller 140.

Input pin CS of the controller 140 receives the output current feedback signal 122-1. Output current feedback signal 122-1 is a voltage value equal to the amount of current flowing through the light emitting hardware 118 multiplied by the resistance of resistor R2. Note that resistor R2 can be also placed in any position within the loop combination of 144, 118, Q2, and D1. Resistor R1 and capacitor C2 represent a low pass filer. Thus, the magnitude of the voltage received at the input pin CS represents a filtered magnitude of the supplied output current 122. Alternatively, the controller 140 can also detect either the positive CS peak voltage or negative CS peak voltage or both, for the output current magnitude representation.

As further discussed herein, the controller 140 receives input control settings 107 associated with controlling the light emitting hardware 118. Based on the input control settings 107, the controller 140 controls a magnitude of the output current 122 generated by the power converter 165.

More specifically, as previously discussed, the input control settings 107 indicate a respective setpoint in which to regulate the output current 122. The controller 140 regulates a magnitude of the output current 122 with respect to a reference current setpoint derived from input control settings 107. The output current 122 from the power converter 165 powers the light emitting hardware 118. As further discussed herein, the controller transitions between operating the power converter 165 in an asynchronous mode and a synchronous mode to produce the output current 122.

As further shown in FIG. 2, the power converter 165 includes diode D1 disposed in parallel with the low side switch circuitry 125-2 (switch Q2). While operating in the asynchronous mode to produce the output current 122, the controller 140 controls activation/deactivation of switch Q1 (ON and OFF) while switch Q2 is always deactivated (OFF) to regulate the output current 122 at a desired setting as specified by the control settings information 107.

Conversely, while operating in the synchronous mode to produce the output current 122, the controller 140 controls activation/deactivation of switch Q1 (ON and OFF) and activation/deactivation of switch Q2 (ON and OFF) in each control cycle to regulate the output current 122 at a desired setting as specified by the control settings information 107.

Figure 3:
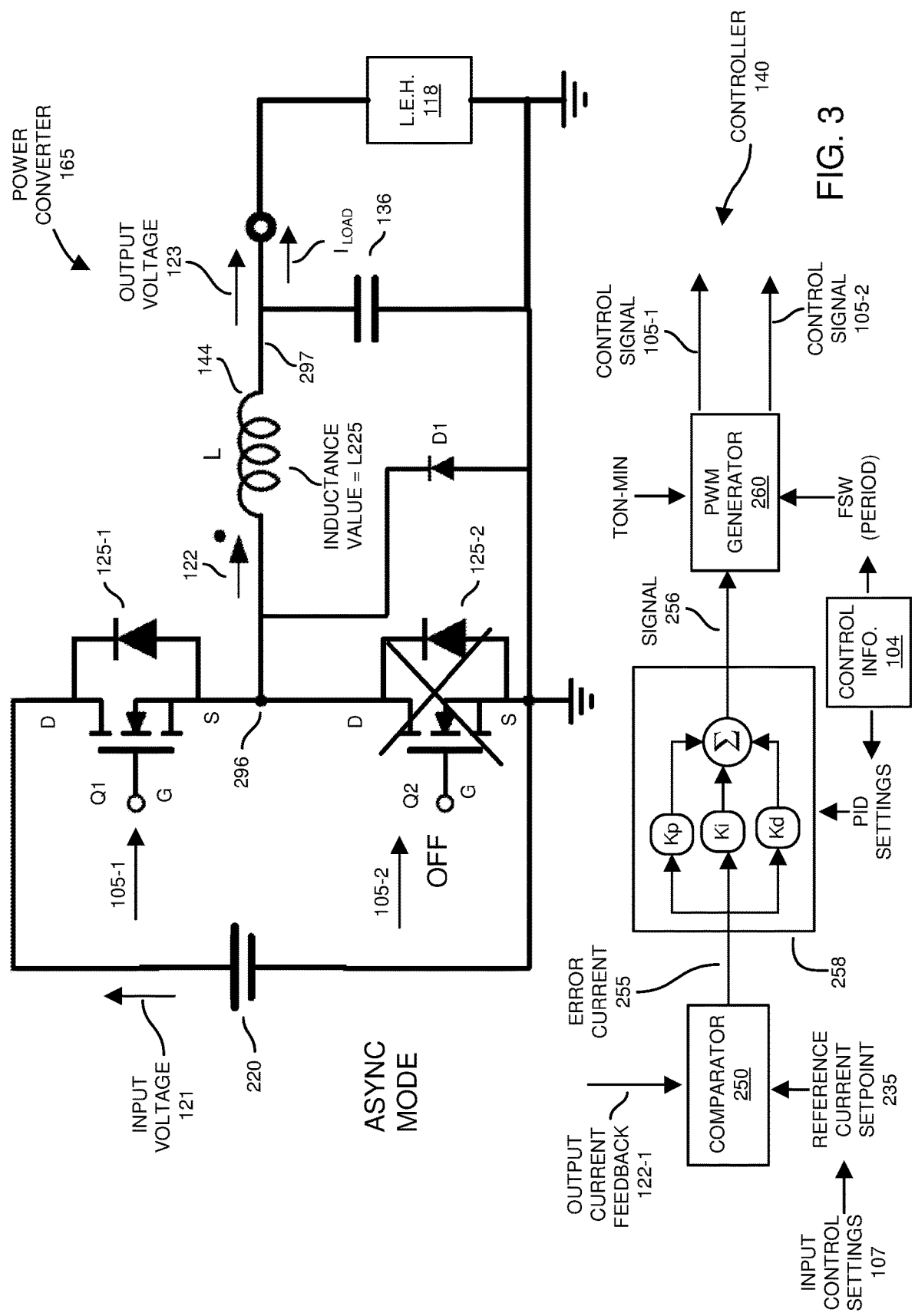
FIG. 3 is an example detailed diagram illustrating a power converter operating in an asynchronous mode according to embodiments herein.

FIG. 3 is an example detailed diagram illustrating a power converter operating in an asynchronous mode according to embodiments herein.

As previously discussed, the power converter 165 and corresponding power supply 135 can be configured as any suitable type of power converter or power converter system.

In this non-limiting example embodiment, the power converter 165 is configured as a buck converter. Power converter 165 includes voltage source 220 (providing input voltage 121), switch Q1 (high side switch circuitry 125-1), switch Q2 (low side switch circuitry 125-2), inductor 144, diode D1, and output capacitor 136 (such as one or more capacitors).

In the asynchronous mode, the controller 140 generates control signal 105-2 to set the switch Q2 to an OFF state while switching the switch Q1 ON and OFF to generate the output current 122.

Switches 125 (Q1, Q2, etc.) can be implemented in any suitable manner. In one embodiment, each of the switches 125 is a so-called field effect transistor. Any suitable type of switches 125 can be used to provide switching as discussed herein.

Note again that, although the power converter 165 in FIG. 2 is shown as a buck converter configuration, the power converter 165 can be instantiated as any suitable type of power converter and include any number of phases, providing regulation of a respective output current 122 to drive a load such as light emitting hardware 118 as described herein.

As further shown in this example embodiment, the switch Q1 of power converter 165 is connected in series with switch Q2 between the input voltage source 220 and corresponding ground reference.

For example, the drain node (D) of the switch Q1 is connected to the voltage source 220 to receive input voltage 121. The switch controller 140 drives the gate node (G) of switch Q1 with control signal 105-1.

The source node (S) of the switch Q1 is connected to the drain node (D) of the switch Q2 at node 296. The switch controller 140 drives the gate node (G) of switch Q2 with control signal 105-2. The source node (S) of the switch Q2 is connected to ground.

As previously discussed, the power converter 165 further includes inductor 144. Inductor 144 extends from the node 296 to node 297 electrically coupled to the output capacitor 136 and light emitting hardware 118.

Via switching of the switch Q1 via respective control signal 105-1 (applied to gate G of switch Q1) and presence of D1 (while switch Q2 is OFF), the node 296 coupling the source (S) node of switch Q1 and the drain (D) node of switch Q2 provides output current 122 through the inductor 144, resulting in generation of the output current 122 and corresponding output current LOAD powering the light emitting hardware 118 and energizing capacitors 136.

In general, the magnitude of the current $I_{LOAD}$ is equal to a magnitude of the output current 122 through inductor 144. Output capacitor 136 stores energy and reduces a ripple associated with the output current 122.

In further example embodiments, as previously discussed, the controller 140 controls switching of the switch Q1 based on one or more feedback parameters. For example, in the asynchronous mode, the controller 140 can be configured to receive output current feedback signal 122-1 derived from the output current 122 supplied to power the light emitting hardware 118 as previously discussed in FIG. 1. The output current feedback signal 122-1 is a voltage generated based on flow of current Iload through the resistor R2 (see FIG. 2).

Referring again to FIG. 3, via the comparator 250, the controller 140 compares the output current feedback signal 122-1 to the reference output current setpoint 235 derived from the input control settings 107.

As previously discussed, the reference current setpoint 235 is a desired setpoint value (derived from the input control settings 107) in which to control a magnitude of the output current 122 during load-line regulation implemented by the power supply 135.

As further shown, the amplifier or comparator 250 produces a respective error current signal 255 based on a difference between the output current feedback signal 122-1 and the reference current setpoint 235. A magnitude of the error current signal 255 generated by the amplifier or comparator 250 varies depending upon the degree to which the magnitude of the output current 122 is in or out of regulation (with respect to the reference current setpoint 235).

In one non-limiting example embodiment, the controller 140 further includes control function 258 such as a PID controller. The control function 258 includes one or more of a P-component (Proportional component), I-component (Integral component), and a D-component (Derivative component) as known in the art to control operation of switches 125 (Q1 and Q2). Control loop gain and bandwidth setting can also be implemented using a compensation network (formed by one of more passive components such as resistor and capacitor), which is connected between input and output of the operational amplifier. This can be applied internally or externally with respect to the controller 140. In voltage mode control, the output of the PID can proportionally control the duty cycle or ON-time of the PWM (control signals 105), and the PWM pulses may be generated at a fixed or variable switching period or frequency. In current mode control, the output of the control function 258 sets the target average current or peak current in the inductor 144, and the PWM pulse is dependent on the current sense information, such that the duty cycle or ON time of the PWM is generated based on the current sense as indicated by the output current feedback (signal) 122-1.

In further example embodiments, the control information 104 (as provided by the controller 140 or other suitable entity) includes PID settings (one or more tuning parameters such as gain value Kp applied to the P-component stage, a gain value Ki applied to the I-component stage, and a gain value Kd applied to the D-component stage).

As further shown, the PWM (Pulse Width Modulation) generator 260 of the controller 140 controls operation of switching the switch Q1 in the asynchronous mode (while switch Q2 is always OFF, diode D1 replaces low side switch activation) based upon the magnitude of the signal 256 (such as control output) from the PID controller 258.

For example, in general, if the error current 255 (signal) indicates that the output current 122 becomes less than a magnitude of the reference current setpoint 235, the PWM generator 260 increases a duty cycle or frequency of activating the high side switch Q1 (thus decreasing a duty cycle in which diode D1 is ON) in a respective switch control cycle.

Conversely, if the error current 255 indicates that the output current 122 (of the power converter 165) becomes greater than a magnitude of the reference current setpoint 235, the PWM generator 260 decreases a duty cycle of activating the high side switch circuitry Q1 (thus increasing a time in which diode D1 is ON) in a respective switching control cycle.

Via variations in the pulse with modulation (and/or frequency modulation) of controlling the respective switch Q1 during the asynchronous mode, the controller 140 controls generation of the output current 122 such that the output current 122 remains within a desired current range with respect to the reference current setpoint 235.

As further discussed herein, note that the magnitude of current 122 through the inductor 144 increases when the high-side switch Q1 (such as one or more field effect transistor or other suitable component) is ON and low-side switch Q2 (such as one or more field effect transistor or other suitable component) is OFF; the magnitude of current 122 through the inductor 144 decreases when the high-side switch Q1 is OFF via presence of the diode D1.

Figure 4:
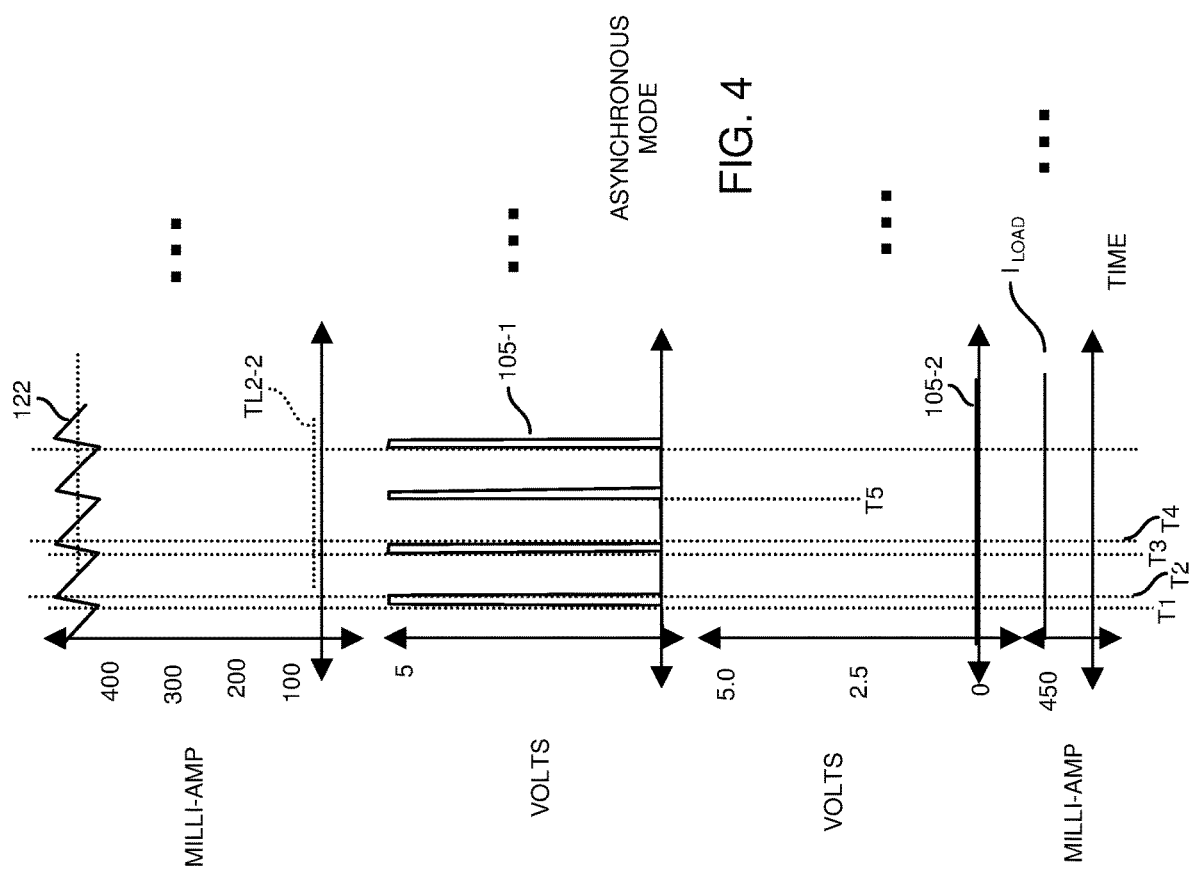
FIG. 4 is an example timing diagram illustrating operation of a power converter in an asynchronous mode according to embodiments herein.

FIG. 4 is an example timing diagram illustrating operation of a power converter in an asynchronous mode according to embodiments herein.

This example embodiment illustrates operation of the power converter 165 in the asynchronous mode. For example, assume that the input control settings 107 (such as generated by a respective user or other suitable entity) indicate to generate the output current 122 at or around 450 mA (milli-Amperes). In other words, the reference current setpoint 235 as indicated by the input control settings 107 is Iload=450 mA.

In such an instance, because the magnitude of the output current 122 is above the threshold level TL2-2, in a first control cycle between time T1 and time T3 (while the switch Q2 is set to an OFF state in the entire control cycle and diode D1 provides current because switch Q2 is OFF), the controller 140: i) activates the high side switch circuitry 125-1 (Q1) to an ON state between time T1 and time T2; ii) deactivates the high side switch circuitry 125-1 (Q1) to an OFF state between time T2 and time T3; in a second control cycle between time T3 and time T5 (while the switch Q2 is set to an OFF state in the entire control cycle), the controller 140: i) activates the high side switch circuitry 125-1 (Q1) to an ON state between time T3 and time T4; ii) deactivates the high side switch circuitry 125-1 (Q1) to an OFF state between time T4 and time T5; and so on.

Repeated cycles of operating the power converter 165 in the asynchronous mode results in generation of the output current 122. Light emitting hardware 118 is driven with Iload (450 mA DC).

Figure 5:
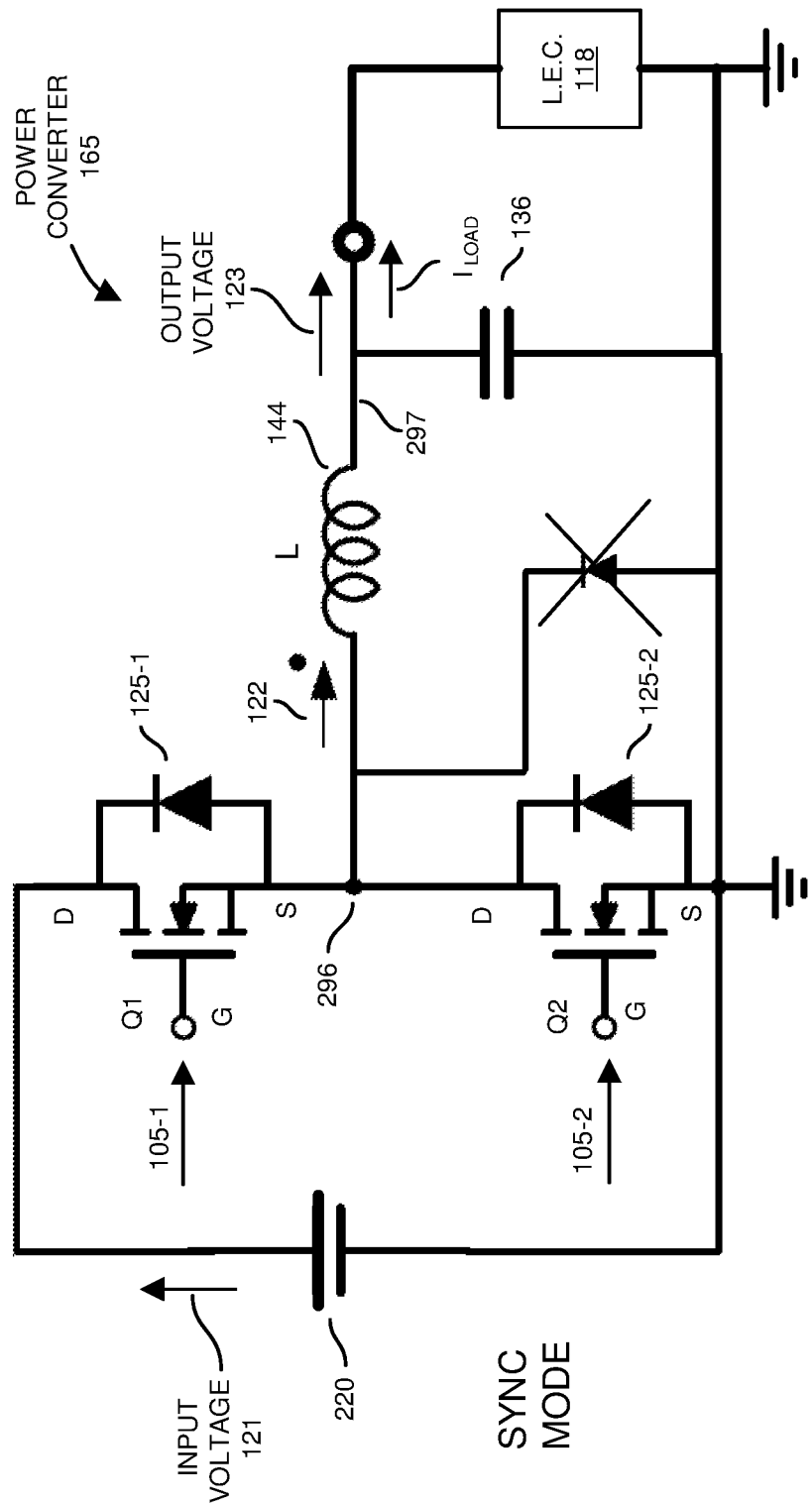
FIG. 5 is an example detailed diagram illustrating a power converter operating in a synchronous mode according to embodiments herein.

FIG. 5 is an example detailed diagram illustrating a power converter operating in a synchronous mode according to embodiments herein.

In the synchronous mode, via the comparator 250, the controller 140 compares the output current feedback signal 122-1 (indicating a magnitude of the output current 122) to the reference output current setpoint 235 derived from the input control settings 107.

As previously discussed, the reference current setpoint 235 is a desired setpoint value (derived from the input control settings 107) in which to control a magnitude of the output current 122 during load-line regulation implemented by the power supply 135.

Via variations in the pulse with modulation (and/or frequency modulation) of controlling the respective switches Q1 and Q2, the controller 140 controls generation of the output current 122 such that the output current 122 remains within a desired current range with respect to the reference current setpoint 235.

As further discussed herein, note that the magnitude of current 122 through the inductor 144 increases when the high-side switch Q1 (such as one or more field effect transistor or other suitable component) is ON and low-side switch Q2 (such as one or more field effect transistor or other suitable component) is OFF; the magnitude of current 122 through the inductor 144 decreases when the high-side switch Q1 is OFF and low side switch circuitry Q2 is ON.

Figure 6:
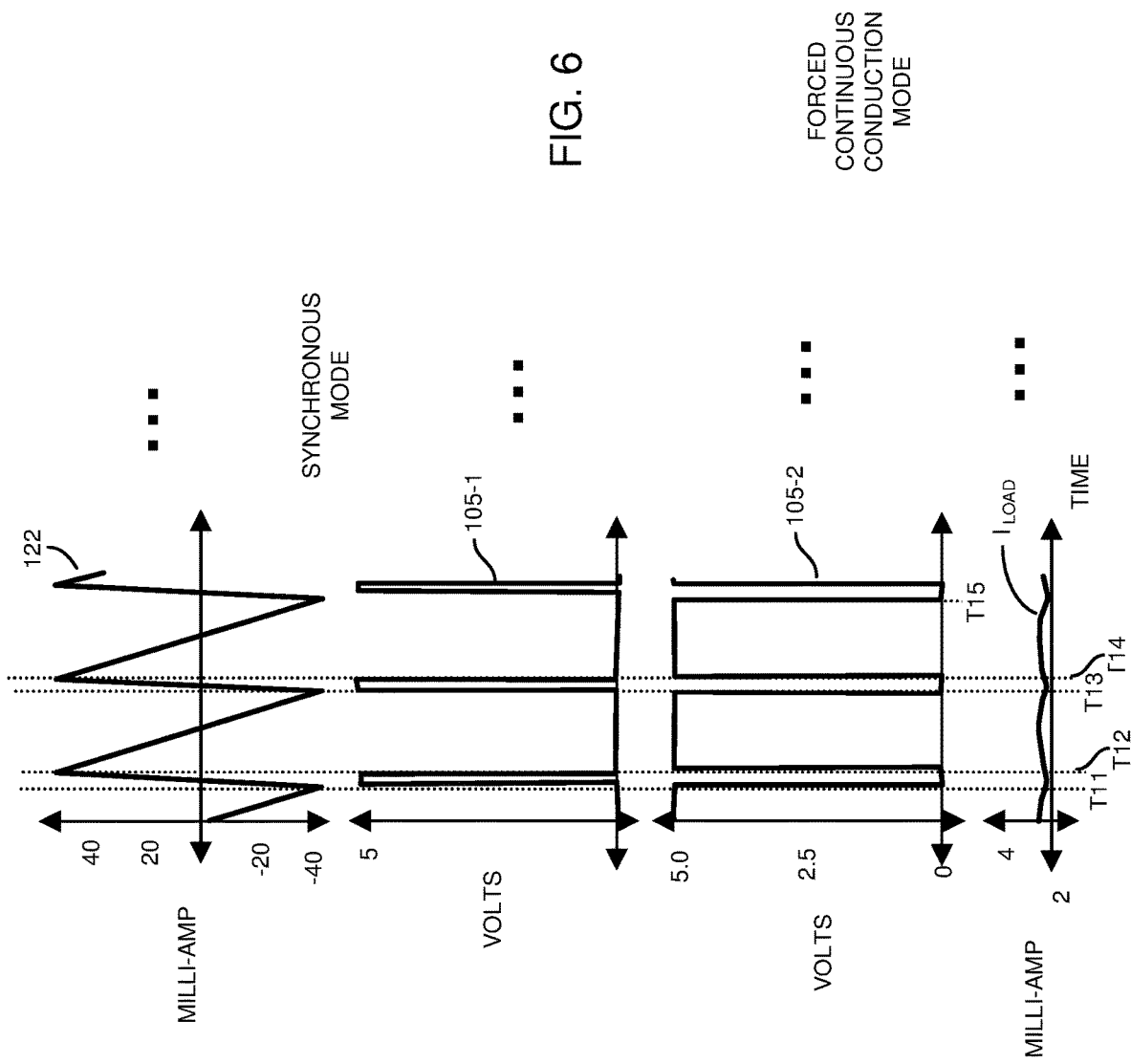
FIG. 6 is an example timing diagram illustrating operation of a power converter in a synchronous mode according to embodiments herein.

FIG. 6 is an example timing diagram illustrating operation of a power converter in a synchronous mode according to embodiments herein.

This example embodiment illustrates operation of the power converter 165 in a synchronous mode. For example, assume that the input control settings 107 (such as generated by a respective user or other suitable entity) indicate to generate the output current 122 at or around 2.5 mA (milli-Amperes), a low current setting. In other words, the reference current setpoint 235 as indicated by the input control settings 107 is Iload=2.5 mA.

In such an instance, because the magnitude of the output current 122 is below the threshold level, in a first control cycle between time T11 and time T13: i) the controller 140 activates the high side switch circuitry 125-1 (Q1) to an ON state and deactivates the switch Q2 to an OFF between time T11 and time T12; ii) the controller 140 deactivates the high side switch circuitry 125-1 (Q1) to an OFF state and activates the low side switch circuitry 125-2 (Q2) to an ON state between time T12 and time T13.

In a second control cycle between time T13 and time T15: i) the controller 140 activates the high side switch circuitry 125-1 (Q1) to an ON state and deactivates the switch Q2 to an OFF between time T13 and time T14; ii) the controller 140 deactivates the high side switch circuitry 125-1 (Q1) to an OFF state and activates the low side switch circuitry 125-2 (Q2) to an ON state between time T14 and time T15.

Repeated cycles of operating the power converter 165 in the synchronous mode results in generation of the output current 122. Light emitting hardware 118 is driven with Iload (2.5 mA DC).

Figure 7:
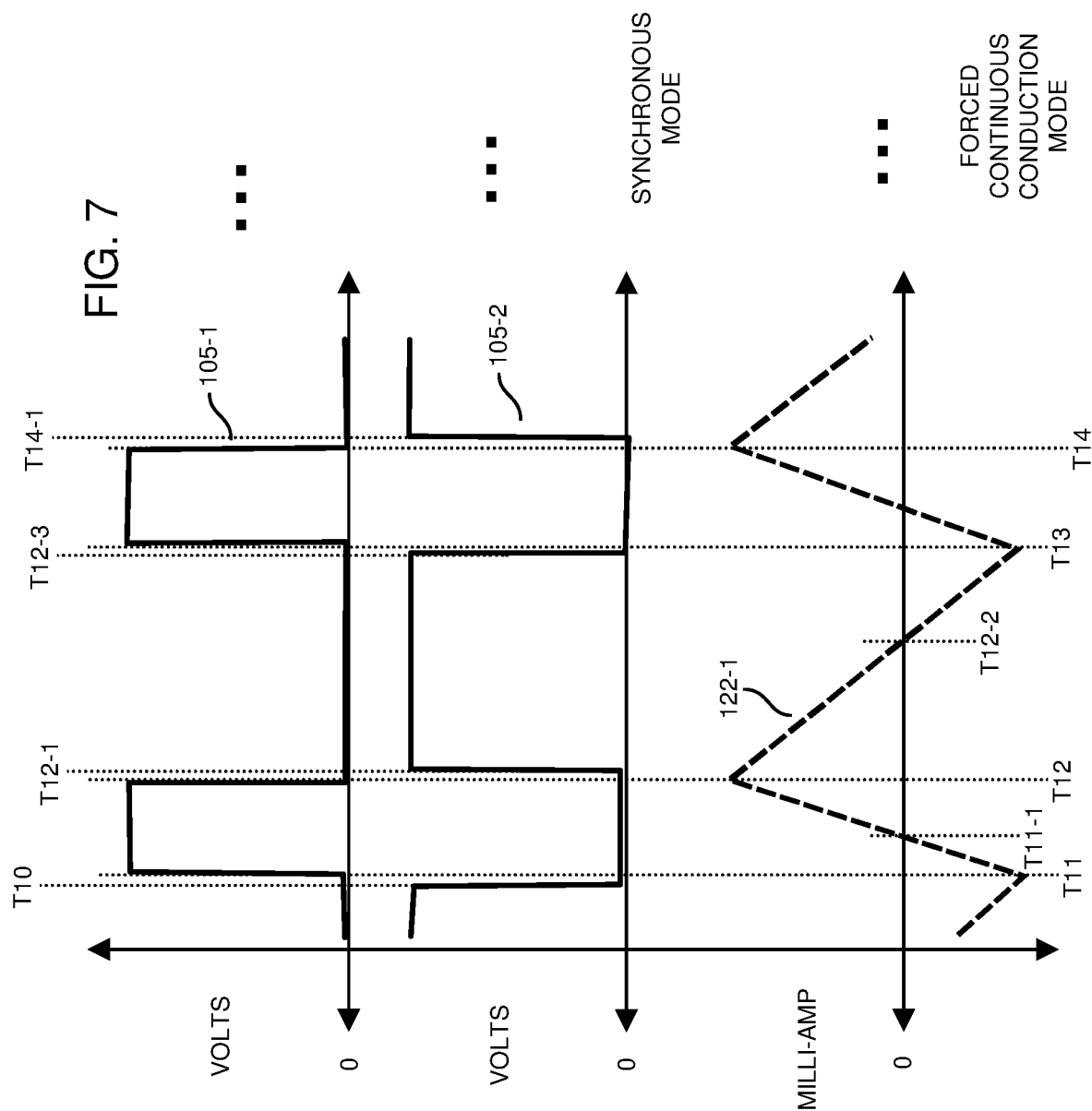
FIG. 7 is an example timing diagram illustrating operation of a power converter in a synchronous mode (and forced continuous conduction mode) according to embodiments herein.

FIG. 7 is an example timing diagram illustrating operation of a power converter in a synchronous mode (and forced continuous conduction mode) according to embodiments herein.

In one embodiment, when the input control settings 107 indicate to operate at a low current magnitude, the controller 140 implements a so-called forced continuous conduction mode to generate the output current 122.

More specifically, as previously discussed, the power converter 165 includes an inductor 144 (energy storage device such as one or more inductor components) that supplies the output current 122 to the load (such as light emitting hardware 118). Operation of the power converter 165 in the forced continuous conduction mode (such as while in the synchronous mode) results in the output current 122 flowing in both a forward direction and reverse direction at different times through the inductor 144 during a respective control cycle of operating the power converter 165.

For example, as previously discussed, in one embodiment, the low side switch is deactivated first before activating the high side switch. An appropriate dead time (such as between T10 and T11, such as between T12 and T12-1, such as between T12-3 and T13, etc.) can be added in between activating the switches when necessary to avoid current shoot through the switches. For FCCM operation, the inserted dead time can also allow SW node voltage to increase and reduce the turn-on loss of the high side switch. The controller 140 deactivates the low side switch circuitry 125-2 at time T10. While the low side switch circuitry 125-2 (Q2) is deactivated between time T10 and T12-1, the controller 140 activates the high side switch circuitry 125-1 (switch Q1) to an ON state between time T11 and time T12. The magnitude of the output current 122 increases between time T11 and time T12. Between time T11 and time T11-1, the output current 122 is negative and flows in a direction from node 297 through inductor 144 to node 296 (see also FIG. 5). Between time T11-1 and time T12, the output current 122 is positive and flows in a direction from node 296 through inductor 144 to node 297 (see also FIG. 5).

Also, as previously discussed, the controller 140 deactivates the high side switch circuitry 125-1 between time T12 and time T13. The controller 140 activates the low side switch circuitry 125-2 (switch Q2) to an ON state between time T12-1 and time T12-3. As shown, the magnitude of the output current 122 decreases between time T12-1 and time T13. Between time T12 and time T12-2, the output current 122 is positive and flows in a direction from node 296 through inductor 144 to node 297 (see also FIG. 5). However, between time T12-2 and time T13, the output current 122 is negative and flows in a direction from node 297 through inductor 144 to node 296 (see also FIG. 5).

Thus, in a single control cycle such as between time T11 and T13, the direction of the output current 122 reverses multiple times (such as at time T11-1 and time T12-1).

Operation of the power converter 165 and corresponding switching in accordance with the forced continuous conduction mode (and synchronous mode) provides improved operation of the light emitting hardware 118 at low levels of output current 122.

In one embodiment, the low side switch circuitry 125-2 (switch Q2) is a small sized switch device having a relatively large Rds ON value (such as around 100 ohms or other suitable value) with respect to high side switch circuitry 125-1 (switch Q1). In one embodiment, the switch Q1 is a power field effect transistor has a low Rds ON impedance. The Rds ON of the switch Q2 is potentially a field effect transistor having an Rds ON value between 5 and 200 (or other suitable value) times the Rds ON of the switch Q1. If desired, the switch is included in a corresponding semiconductor chip implementing functionality associated with controller 140 (see also FIG. 2).

Figure 8:
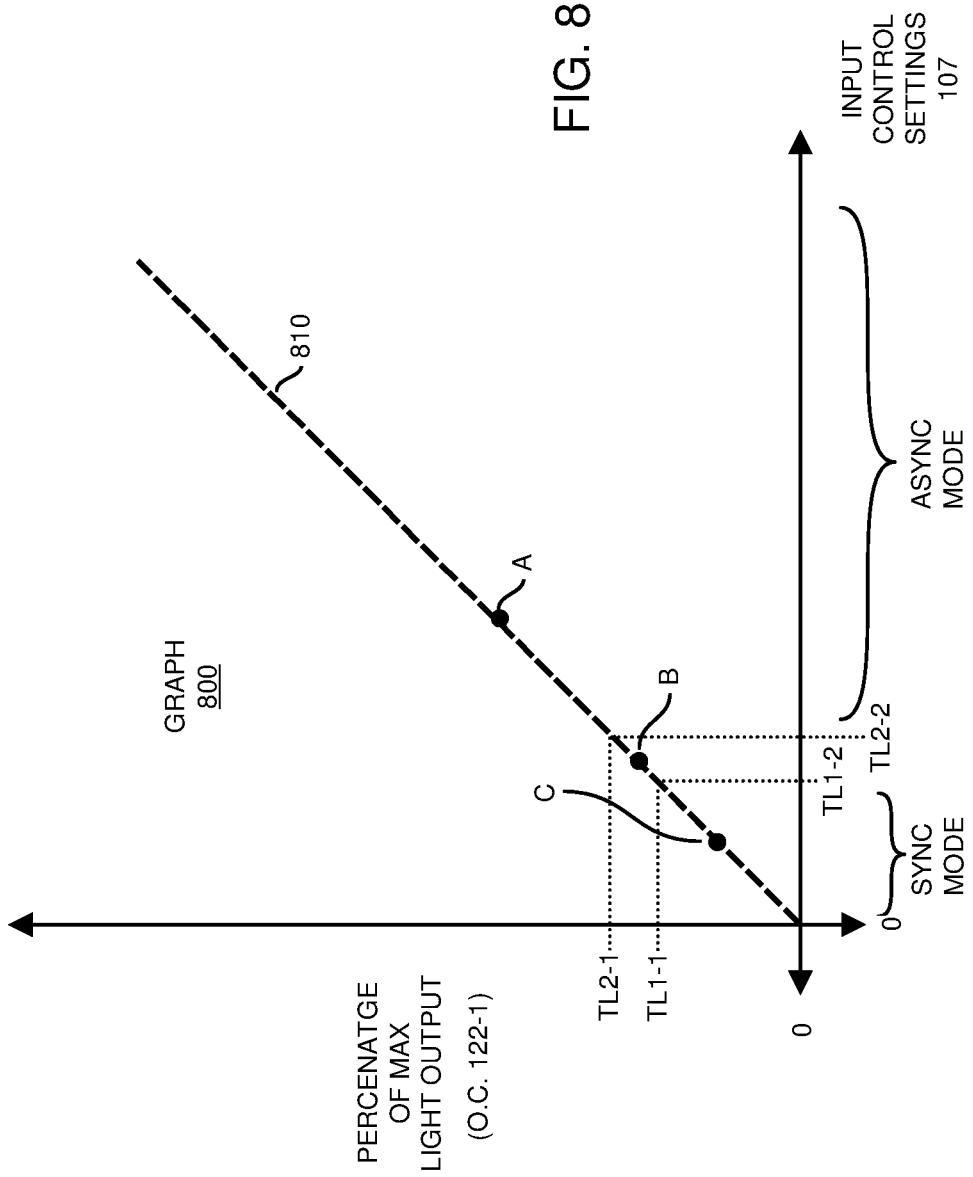
FIG. 8 is an example diagram illustrating implementation of a hysteresis function during switchover from asynchronous to synchronous operational modes according to embodiments herein.

FIG. 8 is an example diagram illustrating implementation of a hysteresis function during switchover from asynchronous to synchronous operational modes according to embodiments herein.

Graph 800 in FIG. 8 includes curve 810 representing operation of the power converter 165 in different modes depending on a magnitude of the input control settings 107 and/or output current 122-1.

As previously discussed, based on the input control settings 107, the controller 140 controls a magnitude of the output current 122 generated by the power converter 165. The output current 122 from the power converter 165 powers the light emitting hardware 118. As shown in graph 800, the controller 140 transitions between operating the power converter 165 in an asynchronous mode and a synchronous mode to produce the output current 122.

Note further that, as previously discussed, the power converter 165 includes low-side switch circuitry 125-2 (switch Q2) and a diode (component) D1 disposed in parallel. The controller 140 uses the low side switch circuitry 125-2 and the diode D1 in different modes.

For example, in one embodiment, the controller 140 switches the low side switch circuitry 125-2 (switch Q2) ON and OFF in each control cycle during operation of the power converter 165 in the synchronous mode. The controller 140 is further operative to continuously deactivate the low side switch circuitry 125-2 during control cycles while the power converter 165 is operated in the asynchronous mode. In this latter instance, the combination of the high side switch circuitry 125-1 (switch Q1) and the diode D1 supports asynchronous operation.

Thus, operation of the power converter in the asynchronous mode includes implementation of high side switch circuitry 125-1 (switch Q1) and a corresponding diode D1 to produce the output current. Conversely, operation in the synchronous mode includes implementation of switching between activating high side switch circuitry 125-1 (switch Q1) and low side switch circuitry 125-2 (switch Q2) in the power converter 165 to produce the output current 122.

Further embodiments herein include, via the controller 140, transitioning the power converter 165 from operating in the asynchronous mode and the synchronous mode depending on a parameter such as magnitude of the output current 122 as set by the input control settings 107. Thus, the change in the operational mode of the power converter 165 results from a change in the input control settings 107 and/or operating point of supplying power to the light emitting hardware 118.

In one embodiment, the controller 140 implements hysteretic mode transitions between operation in the asynchronous mode and operation in the synchronous mode. This prevents unwanted high frequency toggling between the asynchronous mode and the synchronous mode.

As a more specific example, assume that the input control settings 107 indicate to provide a magnitude of output current 122 above the threshold level TL2-2 at point A on the curve 810. In such an instance, at operating point A, the controller 140 operates the power converter 165 in the asynchronous operational mode.

At a first instance of time, assume that the controller 140 detects or receives a change in the input control settings 107 from a first light magnitude setting (corresponding to point A on curve 810) to a second magnitude setting (corresponding to point B on curve 810). The second setting indicates to reduce light output from the light emitting component with respect to the first setting. In response to receiving the change in the control settings from point A to point Bari on the curve 810, and failure of a magnitude of the input control settings 107 to drop below threshold level TL1-2 or TL1-1, the controller 140 continues to operate in the asynchronous mode. That is, the controller 140 does not yet transition the power converter 165 from operating in the asynchronous mode to the synchronous mode (such as including a forced continuous conduction mode).

At a second instance of time, assume that the controller 140 detects or receives a change in the input control settings 107 from the second light magnitude setting (corresponding to point B on curve 810) to a third magnitude setting (corresponding to point C on curve 810). The third setting indicates to reduce light output from the light emitting hardware 118 with respect to the second setting. In response to receiving the change in the input control settings 107 from point B to point C, and thus crossover or reduction of the input control settings 107 below threshold level TL1-2 or TL1-1, the controller 140 transitions the power converter 165 from operating in the asynchronous mode to the synchronous mode (such as including a forced continuous conduction mode).

At a third instance of time, assume that the controller 140 detects or receives a change in the input control settings 107 from the third light magnitude setting (corresponding to point C on curve 810) to the second magnitude setting (corresponding to point B on curve 810). The second setting indicates to increase light output from the light emitting hardware 118 with respect to the third setting (point C). In response to receiving the change in the control settings from point C to point B, and failure to raise above threshold level TL2-1 or TL2-2, the controller 140 continues to operate the power converter 165 in the synchronous mode. That is, the controller 140 does not yet transition the power converter 165 from operating in the synchronous mode to the asynchronous mode.

At a fourth instance of time, assume that the controller 140 detects or receives a change in the input control settings 107 from the second light magnitude setting (corresponding to point B on curve 810) to the first magnitude setting (corresponding to point A on curve 810). The first setting indicates to increase light output from the light emitting hardware 118 with respect to the second setting. In response to receiving the change in the control settings from point B to point A on curve 810, and crossover operation of the power converter 165 above threshold level TL2-1 or TL2-2, the controller 140 transitions the power converter 165 from operating in the synchronous mode to the asynchronous mode.

Accordingly, embodiments herein implementing hysteresis when transitioning the operation of the power converter 165 between the asynchronous mode and the synchronous mode.

Figure 9:
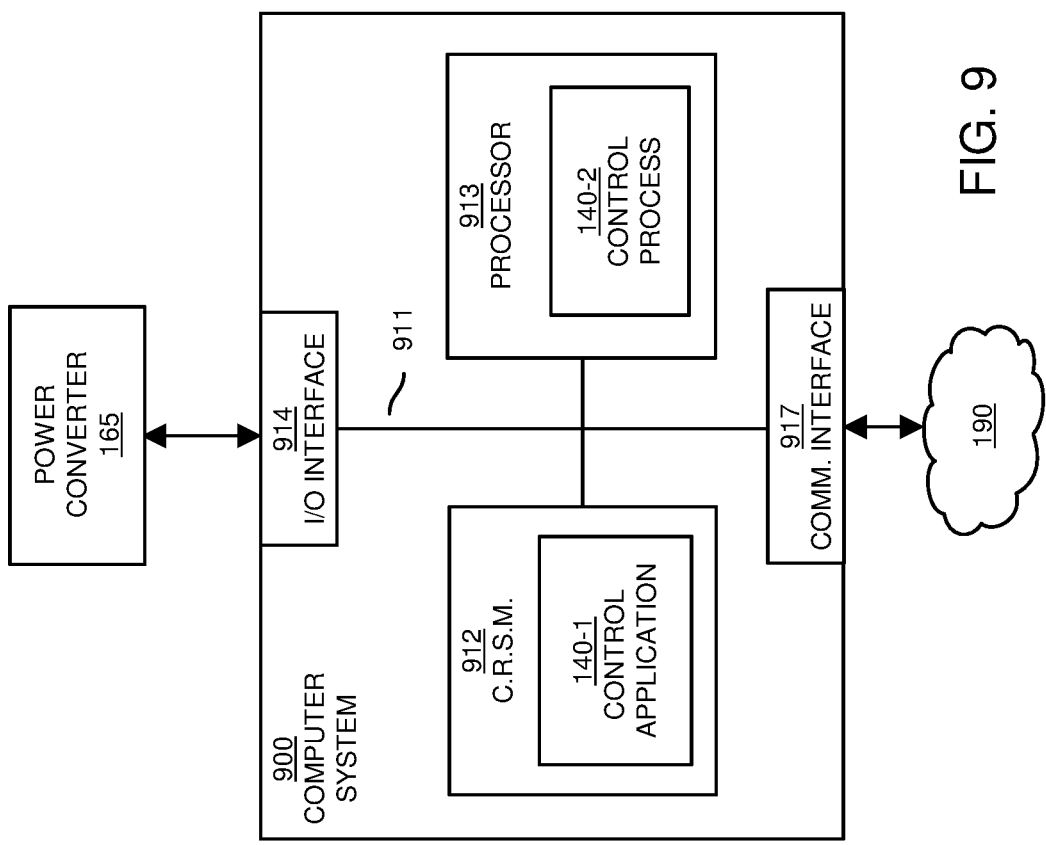
FIG. 9 is an example diagram illustrating computer processor hardware and related software instructions to execute methods according to embodiments herein.

FIG. 9 is an example diagram illustrating computer processor hardware and related software instructions to execute methods/operations according to embodiments herein.

As shown, computer system 900 (such as implemented by any of one or more resources such as controller 140, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 917.

I/O interface 914 provides connectivity to any suitable circuitry such as power converter 165.

Computer readable storage medium 912 can be any hardware storage resource or device such as memory, optical storage, hard drive, floppy disk, etc. In one embodiment, the computer readable storage medium 912 stores instructions and/or data used by the control application 140-1 to perform any of the operations as described herein.

Further in this example embodiment, communications interface 917 enables the computer system 900 and processor 913 to communicate over a resource such as network 190 to retrieve information from remote sources and communicate with other computers.

As shown, computer readable storage media 912 is encoded with control application 140-1 (e.g., software, firmware, etc.) executed by processor 913. Control application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in control application 140-1 stored on computer readable storage medium 912.

Execution of the control application 140-1 produces processing functionality such as control process 140-2 in processor 913. In other words, the control process 140-2 associated with processor 913 represents one or more aspects of executing control application 140-1 within or upon the processor 913 in the computer system 900.

In accordance with different embodiments, note that computer system 900 can be a micro-controller device, logic, hardware processor, hybrid analog/digital circuitry, etc., configured to control a power supply and perform any of the operations as described herein.

Functionality supported by the different resources will now be discussed via flowchart in FIG. 10. Note that the steps in the flowcharts below can be executed in any suitable order.

Figure 10:
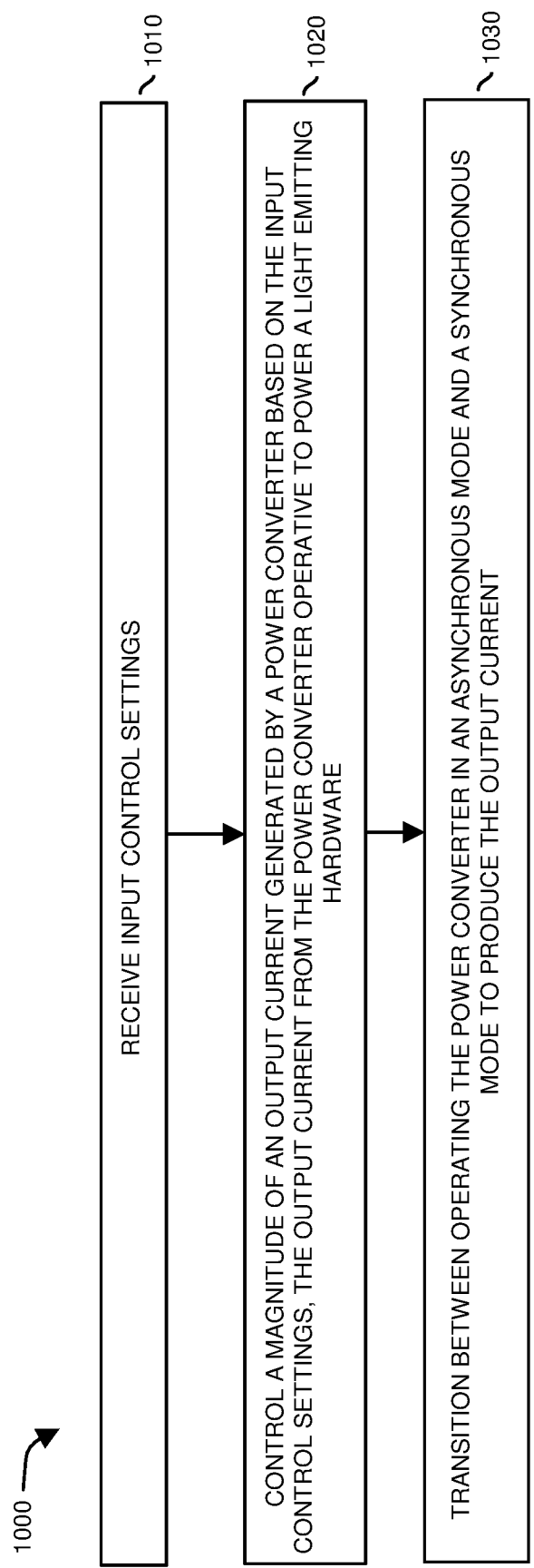
FIG. 10 is an example diagram illustrating a method according to embodiments herein.

FIG. 10 is an example diagram illustrating a method of controlling a power converter during over-voltage condition according to embodiments herein.

In processing operation 710, the controller 140 receives input control settings 107.

In processing operation 720, the controller 140 controls a magnitude of an output current 122 generated by a power converter 165 based on the input control settings 107. The output current 122 from the power converter 165 provides power the light emitting hardware 118.

In processing operation 730, the controller 140 transitions between operating the power converter 165 in an asynchronous mode and a synchronous mode to produce the output current 122. In one embodiment, as previously discussed, the controller 140 selects the mode in which to operate the power converter 165 depending on the magnitude of the output current 122 and/or selected light level being generated by the power converter 165.

Figure 11:
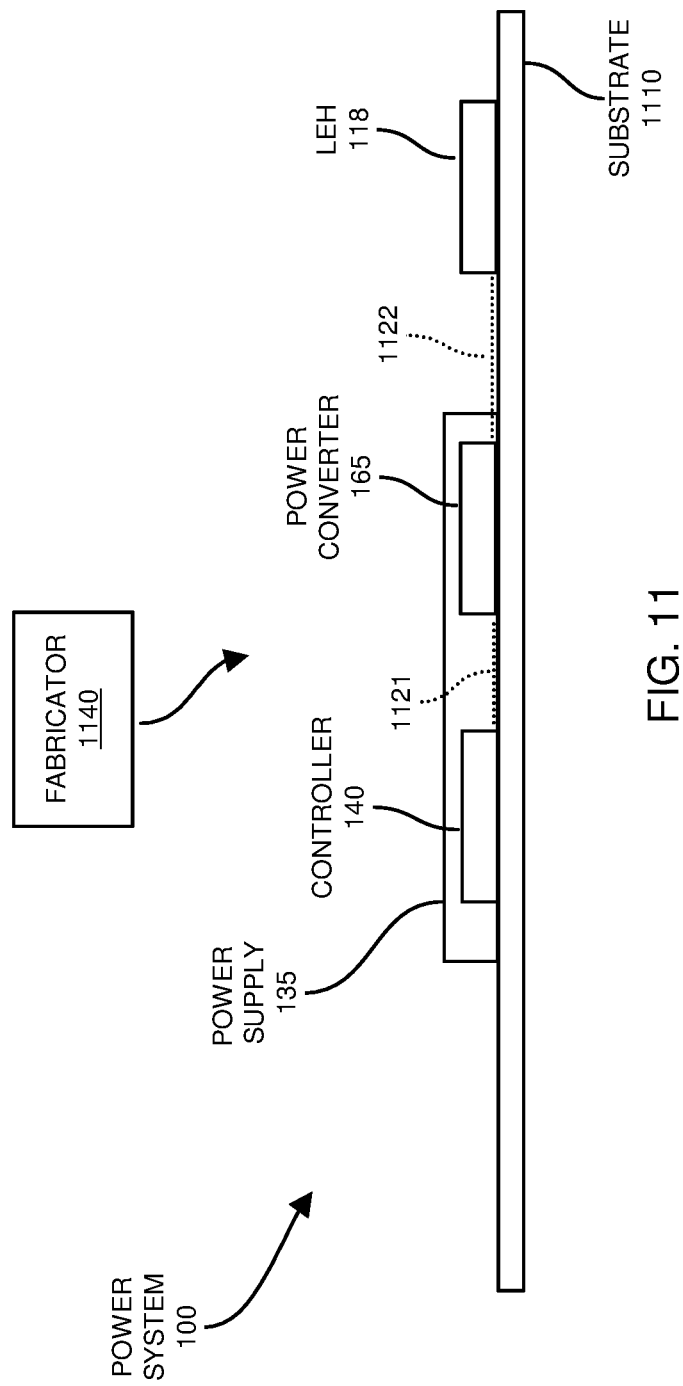
FIG. 11 is an example diagram illustrating fabrication of a circuit according to embodiments herein.

FIG. 11 is an example diagram illustrating fabrication of a power converter circuit on a circuit board according to embodiments herein.

In this example embodiment, fabricator 1140 (such as assembler) receives a substrate 1110 (such as a circuit board).

The fabricator 1140 affixes the power supply 135 (such as including controller 140 and power converter 165 and corresponding components) to the substrate 1110. Via one or more circuit paths 1121 (such as one or more traces, etc.), the assembler 1140 couples the controller 140 to the power converter 165.

Via one or more circuit paths 1122 (such as one or more traces, etc.), the assembler 1140 couples the power converter 165 and corresponding output to the load 118. In one embodiment, the circuit path 1122 conveys the output current 122 generated by the power converter 165 to the light emitting hardware 118 (such as load).

Accordingly, embodiments herein include a system comprising: a substrate 1110 (such as a circuit board, standalone board, mother board, standalone board destined to be coupled to a mother board, etc.); a power converter 165 including corresponding components as described herein; and light emitting hardware 118. As previously discussed, the light emitting hardware 118 is powered based on conveyance of output current 122 conveyed over one or more circuit paths 1122 from the power converter 165 to the light emitting hardware 118.

Figure 12:
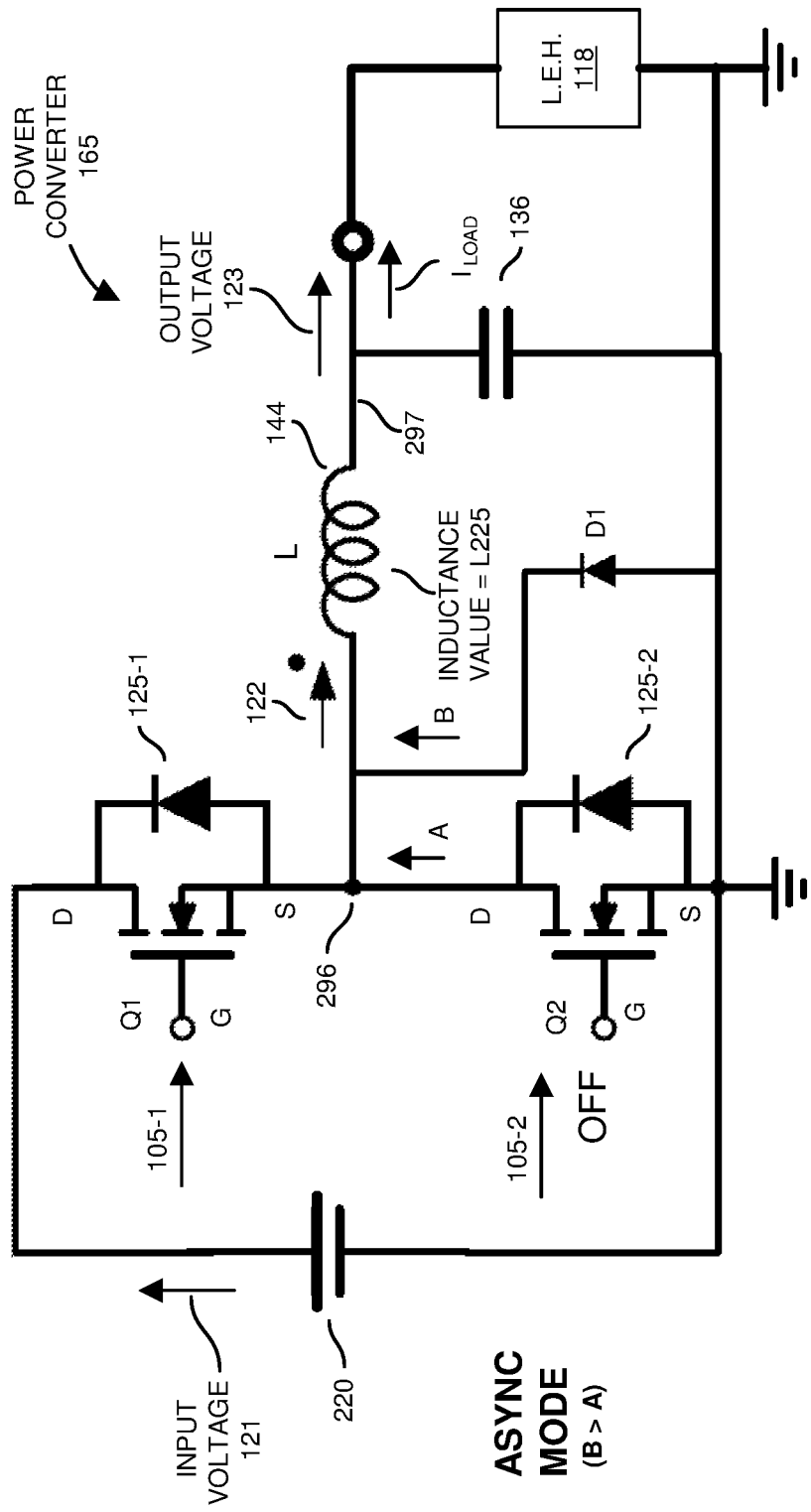
FIG. 12 is an example detailed diagram illustrating an alternative technique of operating a power converter operating in an asynchronous mode according to embodiments herein.

FIG. 12 is an example detailed diagram illustrating an alternative technique of operating a power converter operating in an asynchronous mode according to embodiments herein In this example embodiment, the operation in the asynchronous mode includes controlling the low side switch circuitry 125-2 ON and OFF during a respective control cycle instead of preventing activation of the low side switch circuitry 125-2.

More specifically, in this example embodiment, and in a similar manner as previously discussed, the power converter 165 includes low-side switch circuitry 125-2 and a diode D1 disposed in parallel between node 296 and ground. In this novel asynchronous mode of FIG. 12, the controller 140 switches the low side switch circuitry ON and OFF in each control cycle (see FIG. 13 for timing) during operation of the power converter 165. However, in this instance, both the current A through the low side switch circuitry 125-2 (when activated) and current B through the diode contribute to generation of the output current 122 supplied by the inductor 144 to the output capacitor 136 and the light emitting hardware 118.

In this example embodiment, the operation of the power converter 165 is considered to be the asynchronous mode when the magnitude of the current B is greater than a magnitude of the current A during the latter portion of a control cycle when the low side switch circuitry is activated. Additional details are shown in FIG. 13.

FIG. 13 is an example timing diagram illustrating operation of a power converter in an asynchronous mode according to embodiments herein.

With reference to FIGS. 12 and 13, in this asynchronous control mode, the controller 140 activates high side switch circuitry 125-1 and low side switch circuitry 125-2 at different times as shown in FIG. 13 to produce the output current 122. Activation of the low side switch circuitry 125-2 between time T62 and T63, between time T64 and T65, etc., contributes to generation of the output current 122. During activation of the low side switch circuitry in these time durations or ranges T62-T63, T64-T65, etc., and when the magnitude of the output current 122 is above threshold level TL2-2 or other suitable threshold value, a combination of the current A through the low side switch circuitry 125-2 and current B through the diode D1 supplies the output current 122 during that portion of the control cycle. As previously discussed, even though the low side switch circuitry 125-2 is activated at times during a respective control cycle, this is considered an asynchronous operational mode because the magnitude of the current B is greater than the magnitude of the current A, or the fraction of the current B divided by current A is greater than a threshold value.

Note again that techniques herein are well suited for use in circuit applications such as those that implement power conversion and control of respective light emitting hardware. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a controller operative to:
   receive control input indicating output current settings in which to control a power converter;
   control a magnitude of an output current generated by the power converter as specified by the control input, the output current from the power converter operative to power light emitting hardware;
   transition between operating the power converter in an asynchronous mode and a synchronous mode to produce the output current; and
   wherein the power converter includes low-side switch circuitry and a diode component disposed in parallel, the controller operative to switch the low side switch circuitry ON and OFF in each control cycle during operation of the power converter in the synchronous mode, the controller operative to continuously deactivate the low side switch circuitry during control cycles while the power converter is operated in the asynchronous mode.

2. The apparatus as in claim 1, wherein the controller is operative to control switching of the power converter in accordance with the asynchronous mode during conditions in which the control input indicates to generate the magnitude of the output current supplied to the light emitting hardware to be above a threshold level.

3. The apparatus as in claim 1, wherein the controller is operative to control switching of the power converter in accordance with the synchronous mode during conditions in which the control input indicates to produce the magnitude of the output current supplied to the light emitting hardware to be below a threshold level.

4. The apparatus as in claim 3, wherein the synchronous mode is a forced continuous conduction mode in which current through a respective inductor of the power converter reverses direction during a respective control cycle to power the light emitting hardware.

5. The apparatus as in claim 1, wherein the operation in the asynchronous mode includes implementation of high side switch circuitry and the diode component in the power converter to produce the output current.

6. The apparatus as in claim 1, wherein the operation in the synchronous mode includes implementation of switching between activating high side switch circuitry and the low side switch circuitry in the power converter to produce the output current.

7. The apparatus as in claim 1, wherein the controller is further operative to transition the power converter from operating in the asynchronous mode and the synchronous mode depending on a magnitude of the output current as specified by the control input.

8. The apparatus as in claim 1, wherein the controller is further operative to transition the power converter from operating in the asynchronous mode to the synchronous mode in response to a change of the control input from a first setting to a second setting, the second setting indicating to reduce a magnitude of light output from the light emitting hardware with respect to the first setting.

9. The apparatus as in claim 1, wherein the controller is further operative to transition the power converter from operating in the synchronous mode to the asynchronous mode in response to a change of the control input from a first setting to a second setting, the second setting indicating to increase a magnitude of light output from the light emitting hardware with respect to the first setting.

10. The apparatus as in claim 1, wherein the power converter includes an inductor operative to supply the output current to the light emitting hardware; and
   wherein the synchronous mode is a forced continuous conduction mode in which the output current flows in a forward direction and reverse direction at different times through the inductor during a respective control cycle of operating the power converter.

11. The apparatus as in claim 1, wherein the controller is further operative to implement hysteretic mode transitions between operation in the asynchronous mode and operation in the synchronous mode.

12. The apparatus as in claim 1, wherein the controller is operative to switch the low side switch circuitry ON and OFF in a respective control cycle during operation of the power converter in the asynchronous mode in which the output current includes first current supplied though the diode component and second current supplied through the low side switch circuitry, a magnitude of the first current being greater than a magnitude of the second current during the asynchronous mode, the diode component disparately located with respect to the low side switch circuitry.

13. The apparatus as in claim 1, wherein the controller is operative to transition from operating the power converter in the asynchronous mode to operating the power converter in the synchronous mode to produce the output current depending on the magnitude of the output current.

14. The apparatus as in claim 1, wherein the low side switch circuitry includes an inherent diode; and
wherein the diode component is a separate component with respect to the low side switch circuitry and is disposed in parallel with the inherent diode of the low side switch circuitry.

15. The apparatus as in claim 1 further comprising:
an inductor coupled to the low side switch circuitry and the diode component;
wherein the low side switch circuitry supplies first current through the inductor during the synchronous mode to produce the output current; and
wherein the diode component supplies second current through the inductor during the asynchronous mode to produce the output current.

16. The apparatus as in claim 1, wherein the controller is further operative to transition the power converter between operation of the power converter in the asynchronous mode and the synchronous mode depending on a magnitude setting of the output current as specified by the control input.

17. The apparatus as in claim 1, wherein the synchronous mode is a mode in which current flows in both directions through a respective inductor of the power converter during each respective control cycle of multiple control cycles, the current through the inductor producing the output current to power the light emitting hardware.

18. The apparatus as in claim 1, wherein the output current generated by the power converter is supplied from an inductor of the power converter through a series combination of the light emitting hardware and a resistor component; and
wherein the controller is operative to receive feedback from a node coupling the light emitting hardware to the resistor component, the feedback indicating a magnitude of the output current.

19. The apparatus as in claim 18, wherein the controller is further operative to:
compare the feedback to a threshold level derived from the control input; and
regulate the magnitude of the output current with respect to the threshold level, the output current supplied to a combination of the light emitting hardware and capacitor disposed in parallel with the light emitting hardware.

20. A method comprising:
receiving control input indicating output current control settings of a power converter;
controlling a magnitude of an output current generated by the power converter as specified by the control input, the output current from the power converter operative to power light emitting hardware;
transitioning between operating the power converter in an asynchronous mode and a synchronous mode to produce the output current; and
wherein the power converter includes low-side switch circuitry and a diode component disposed in parallel, the method further comprising:
switching the low side switch circuitry ON and OFF in each control cycle during operation of the power converter in the synchronous mode; and
continuously deactivating the low side switch circuitry during control cycles of operating the power converter in the asynchronous mode.

21. The method as in claim 20 further comprising:
switching high side switch circuitry in the power converter in accordance with the asynchronous mode during conditions in which the control input indicates to provide power to the light emitting hardware above a threshold level.

22. The method as in claim 20 further comprising:
switching high side switch circuitry and the low side switch circuitry of the power converter in accordance with the synchronous mode during conditions in which the control input indicates to provide power to the light emitting hardware below a threshold level.

23. The method as in claim 22, wherein the synchronous mode is a forced continuous conduction mode.

24. The method as in claim 20, wherein the operation of the power converter in the asynchronous mode includes implementation of high side switch circuitry and the diode component in the power converter to produce the output current.

25. An apparatus comprising:
a controller operative to:
receive control input indicating output current settings in which to control a power converter;
control a magnitude of an output current generated by the power converter as specified by the control input, the output current from the power converter operative to power light emitting hardware; and
transition between operating the power converter in an asynchronous mode and a synchronous mode to produce the output current;
wherein the controller is further operative to:
monitor the magnitude of the output current, the output current supplied to a combination of the light emitting hardware and a capacitor disposed in parallel with the light emitting hardware; and
regulate the magnitude of the output current from the power converter with respect to an output current value as specified by the control input.

26. The apparatus as in claim 25, wherein the controller is further operative to regulate the magnitude of the output current based on peaks of the monitored magnitude of the output current.

* * * * *